United States Patent
Bishop et al.

(10) Patent No.: US 6,527,114 B2
(45) Date of Patent: *Mar. 4, 2003

(54) CONNECTOR PLATE PACKAGE AND METHOD

(75) Inventors: Charles W. Bishop, Litchfield, IL (US); Carl E. Virta, Bedford, TX (US)

(73) Assignee: Alpine Engineered Products, Inc., Pompano Beach, FL (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/176,683

(22) Filed: Oct. 21, 1998

(65) Prior Publication Data

US 2002/0100703 A1 Aug. 1, 2002

(51) Int. Cl.[7] .............................................. B65D 85/46
(52) U.S. Cl. ........................ 206/321; 206/451; 206/499
(58) Field of Search ................................ 206/321, 338, 206/342, 449, 451, 497, 504–507, 557, 558, 585, 459.5, 499; 53/399, 443; 40/312

(56) References Cited

U.S. PATENT DOCUMENTS

| | | | |
|---|---|---|---|
| 3,963,452 A | | 6/1976 | Jureit et al. |
| 4,036,364 A | * | 7/1977 | Ambrose ...................... 206/497 |
| 4,062,448 A | * | 12/1977 | Meighan ...................... 206/497 |
| 4,111,239 A | * | 9/1978 | Taub .......................... 206/449 |
| 4,170,294 A | * | 10/1979 | Zelinski ...................... 206/497 |
| 4,475,653 A | * | 10/1984 | Ullman ........................ 206/497 |
| 4,919,270 A | * | 4/1990 | Govang et al. ............. 206/497 |
| 5,392,908 A | | 2/1995 | Black, Jr. |
| 5,634,319 A | * | 6/1997 | Black, Jr. ..................... 53/399 |
| 5,636,494 A | | 6/1997 | Black, Jr. |
| 5,906,264 A | | 5/1999 | Black et al. |
| 6,089,368 A | * | 7/2000 | Lindgren et al. ........... 206/499 |

* cited by examiner

Primary Examiner—Luan K. Bui
(74) Attorney, Agent, or Firm—Crutsinger & Booth (57) ABSTRACT

The invention is directed to a connector plate packaging system and method of packaging connector plates for storage and transport. Each connector plate has a planar base with a plurality of teeth extending from the front face thereof. The package comprises a tray and a plurality of connector plate pairs. Each connector plate of each pair is arranged tooth-to-tooth such that the teeth extend toward the other connector plate of the pair in a tooth-to-tooth arrangement. The connector plate pairs are arranged back-to-back such that the back face of one of the connector plates of one of the pairs is in parallel abutment with the back face of one of the connector plates of another pair. The plurality of connector plate pairs are disposed in a tray. In one aspect of the invention, the tray and plurality of connector plate pairs are enclosed in wrapping material. A bundle of connector plate packages is described having a plurality of connector plate packages arranged in a stack having multiple adjacent layers, each layer having a group of packages arranged in abutting relationship. In one aspect of the invention, the stack of connector plate packages is arranged on a support structure and enclosed in a bundle wrapping material. In another other aspects, the bundle includes cornerboards or end-caps adjacent the stack of connector plate packages for protection and stability.

52 Claims, 7 Drawing Sheets

CONNECTOR PLATE PACKAGE AND METHOD

TECHNICAL FIELD

The present invention relates to packaging, storing and transporting connector plates, such as those used to connect structural members to form trusses and joists.

BACKGROUND

Connector plates usually comprise a planar metal base having a plurality of integrally-formed rigid teed extending generally perpendicularly to the front of the base. The connector plates are primarily used in construction to join wooden structural members to form trusses and joists. In fabrication, the wooden members which will form a truss are arranged in a jig, usually on a truss table, with the wooden members in a desired configuration. The connector plates are then placed to overlap the joints between members. Usually the connector plates are lightly tapped in place by assembly workers so that they hold their position for later pressing. Once the connector plates are arranged, they are pressed into the wooden members by a compression clamp or gantry press such that the plurality of teeth are embedded into the wood. The truss is then turned over and the process repeated on the opposite side.

Connector plates are typically fabricated, then packaged for transport to a truss assembly plant. Several methods of packaging the connector plates for transport have been used with varying success. Often, connector plates are packaged in random order in cardboard boxes. Even with the use of vibratory machines to facilitate efficient packing, much of the box space is wasted. In addition, once the connector plates are used the end-user is left with a bulky packaging box which is difficult to break down and dispose of. Boxes are also expensive, so large boxes are utilized to limit packaging costs. The larger boxes, however, are heavy and unwieldy and can be difficult to store conveniently close to the truss table.

Connector plates can also be packaged tooth-to-tooth, as described in U.S. Pat. No. 3,963,452 to John C. Jureit, et al. and in U.S. Pat. No. 5,392,908 to William H. Black, Jr. In the tooth-to-tooth arrangement the connector plates are not randomly placed in a box, but are rather placed in pairs with the planar bases of the plates in parallel and the plurality of teeth of each plate extending toward the opposite plate base. In the Black patent, multiple pairs are in packages bundles held together by a strap. The straps can bundle only a limited number of plates effectively and cannot be used on smaller plates. Additionally, once the strap is cut to free the plates for use, the plates tend to slide apart into an untidy heap making it difficult to move and store unstrapped bundles. Further, a user will not always utilize an entire bundle at a time leaving excess plates which are difficult to move and store. Lastly, tags which can be attached to the bundle straps for inventory and identification purposes are prone to falling off.

Thus, it is an object of this invention to provide an inexpensive method of packaging resulting in packages which are easily handled. Another object is to provide a method of packaging which can be used for a wide range of plate sizes and numbers. Another object is to provide for a packaging system which allows convenient storage and handling of excess plates. Another object is to provide a package which can be easily broken down and disposed of. Another object is to provide a packaging system which can be readily marked for identification and inventory purposes.

Other objects and benefits of the invention will be apparent from the description below.

SUMMARY OF THE INVENTION

The invention is directed to a connector plate packaging system and method of packaging. A connector plate package for storage and transport of connector plates such as used in the construction of trusses and joists is described. Each connector plate has a generally planar base with a front face, a back face, and a plurality of teeth extending from the front face thereof The package comprises a tray and a plurality of connector plate pairs. Each connector plate of each pair has its teeth extending toward the other connector plate of the pair in a tooth-to-tooth arrangement, The connector plate pairs are arranged such that the back face of the planar base of one of the connector plates of one of the pairs is in generally parallel abutment with the back face of the planar base of one of the connector plates of another pair, in a back-to-back arrangement. The plurality of connector plate pairs are disposed in a tray. in one aspect of the invention, the tray and plurality of connector plate pairs are enclosed in wrapping material.

In another aspect of the invention, a bundle of connector plate packages is described having a plurality of connector plate packages arranged in a stack having multiple adjacent layers, each layer having a group of packages arranged in abutting relationship. In another aspect, the stack of connector plate packages is arranged on a support structure and enclosed in a bundle wrapping material. In another aspect, the bundle includes cornerboards or end-caps adjacent the stack of connector plate packages for protection and stability.

BRIEF DESCRIPTION OF THE DRAWINGS

Drawings of a preferred embodiment of the invention are annexed hereto, so that the invention may be better and more fully understood, in which.

Numeral references are employed to designate like parts throughout the various figures of the drawing. Terms such as "left," "right," "clockwise," "counter-clockwise,"

"horizontal," "vertical," "up" and "down" when used in reference to the drawings, generally refer to orientation of the parts in the illustrated embodiment and not necessarily during use. The terms used herein are meant only to refer to relative positions and/or orientations, for convenience, and are not to be understood to be in any manner otherwise limiting. Further, dimensions specified herein are intended to provide examples and should not be considered limiting.

DESCRIPTION OF A PREFERRED EMBODIMENT

Figures 1, 2:
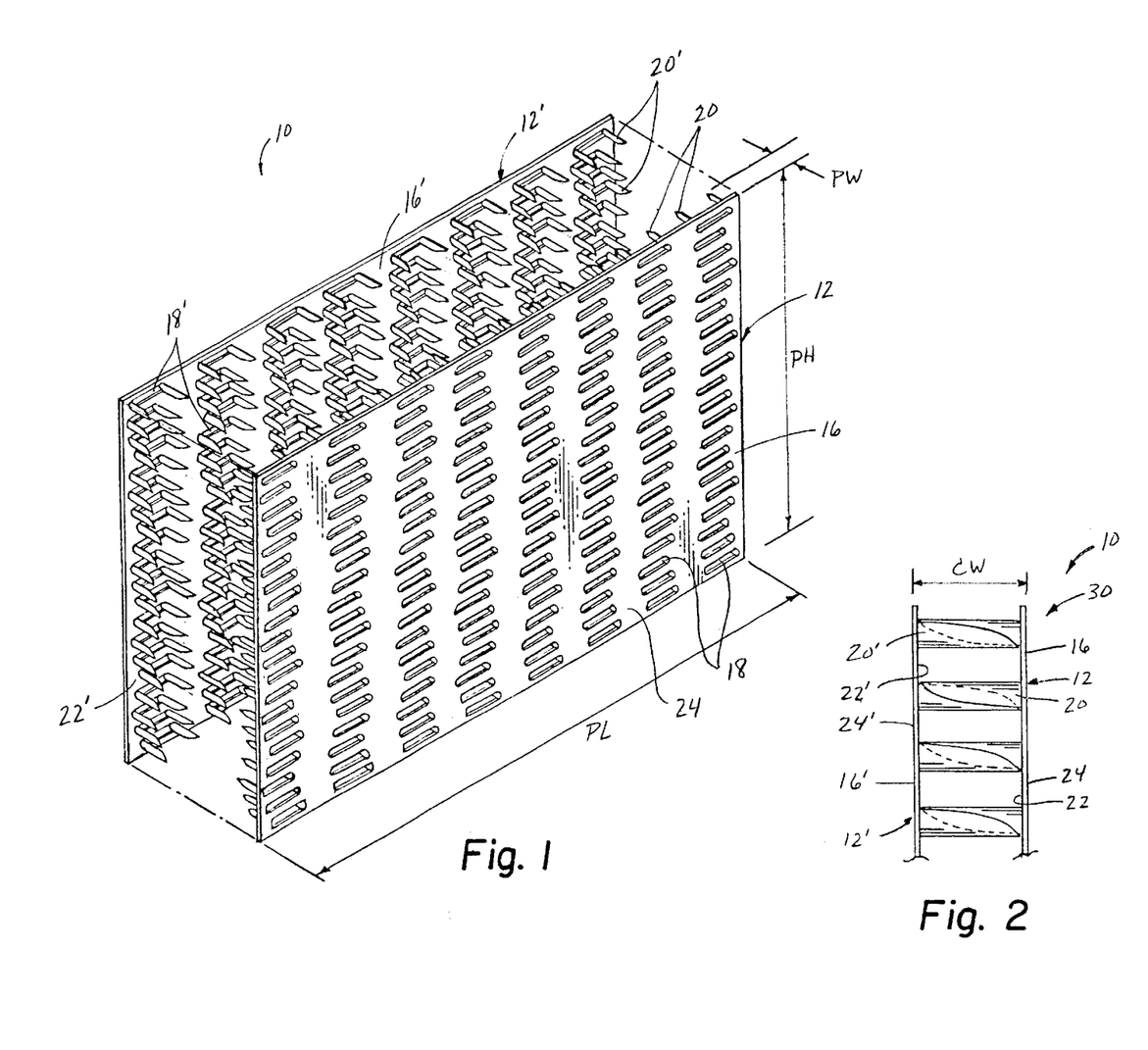
FIG. 1 is an exploded perspective view of a pair of connector plates arranged tooth-to-tooth.
FIG. 2 is a partial elevational side view of a pair of connector plates in tooth-to-tooth arrangement.

Referring now to the drawings, a pair of connector plates 10 is seen in FIGS. 1 and 2. Each connector plate 12 and 12' has a planar base 16 and 16', or backing, having elongated openings 18 and 18' and a plurality of teeth 20 and 20' extending from the front face thereof 22 and 22'. The back face 24 and 24' of the planar base 16 and 16', that is, the side without teeth, is relatively flat. The planar plate bases are typically made of sheet metal and can be of varying size and shape, although the rectangular shape shown is preferred. The teeth 20 are often formed by punching out the planar base 16 of the plate 12, but it is understood that the invention is not dependent on the method of manufacture of the plate. Each plate has a length PL, a height PH, and a width PW. The width is determined by the gage of the planar base and the length of the teeth extending from the base. The dimensions of the connector plate may, of course, vary. For purposes of discussion, a sample plate size of 8 inches (20.3 cm) in length, 5 inches (12.7 cm) in height, and approximately ⅜ inch (0.95 cm) in width will be used.

An opposing pair of connector plates 10 are arranged such that the planar bases 16 and 16' are in parallel and overlapping with the teeth 20 and 20' of each plate extending toward the opposing plate base 16 and 16'. Thus, the pair of plates 10 is arranged tooth-to-tooth. The teeth 20 and 20' of the opposing plates 10 are not in exact alignment thereby allowing the plates to be brought together in a paired position 30, as seen in FIG. 2. In the paired position 30 the teeth 20 and 20' of adjacent plates tend to nest with one another preventing excessive sliding of the paired plates relative to one another. The pair of plates 10 has an approximate combined width CW of ½ inch (1.3 cm) in the preferred embodiment, or slightly greater than the width of a single plate. The combined width CW will vary if connector plates having longer teeth or heavier gage metal are employed.

Figure 3:
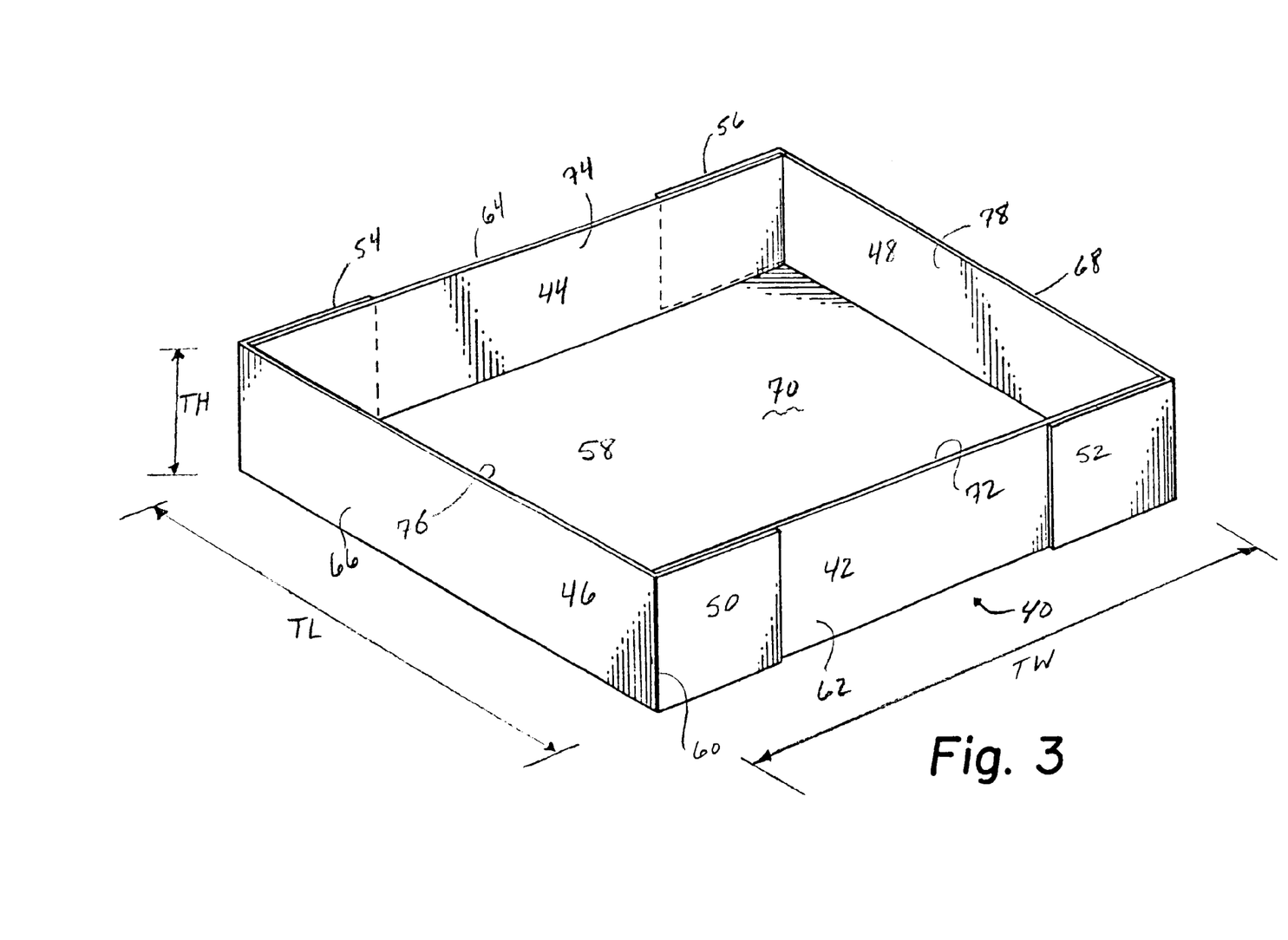
FIG. 3 is a perspective view of a tray for packaging connector plates.

In FIG. 3 a connector plate tray 40 is seen having sides 42, 44, 46 and 48, flaps 50, 52, 54 and 56, and a bottom 58. The tray 40 is typically of a single piece of cardboard or like substance which is configured to be folded into the shape seen in FIG. 3. Of course, the tray 40 may be formed of separate members or another substance, but a unitary cardboard construction is preferred. For purposes of explanation, the relation of sides 42 and 46 and flap 50 will be discussed. Flap 50 is connected to side 46 along fold 60. The flap 50 is preferably glued to side 42, although other means of connection, such as stapling, can be utilized. In a similar fashion the other flaps are connected to the other sides as shown. In the preferred embodiment, the flap 50 is arranged such that it connects to the exterior wall 52 of side 42 as shown. The flaps 50, 52, 54 and 56 are preferably connected to the exterior walls 62, 64, 66 and 68 of the sides 42, 44, 46 and 48 of the tray so that the interior space 70 of the tray is defined by interior walls 72, 74, 76 and 78 without the interruptions which would be present if the flaps were connected to the interior walls 72, 74, 76 and 78 of the sides.

The tray 40 is lighter and less expensive than a box and is easier to break down into a flat sheet of cardboard by simply tearing the flaps from the sides and flattening the folds of the cardboard. Once broken down, the trays use very little space for storage until they can be disposed of or recycled.

The tray 40 has a length TL, height TH and width TW. These dimensions may vary, but in the example embodiment the interior 70 of the tray is 8 inches (20.3 cm) long, 2 inches (5.1 cm) tall and 10 inches (25.4 cm) wide. The dimensions of the tray may be selected depending on the dimensions of the connector plates to be packaged as will hereinafter be explained.

Figure 4:
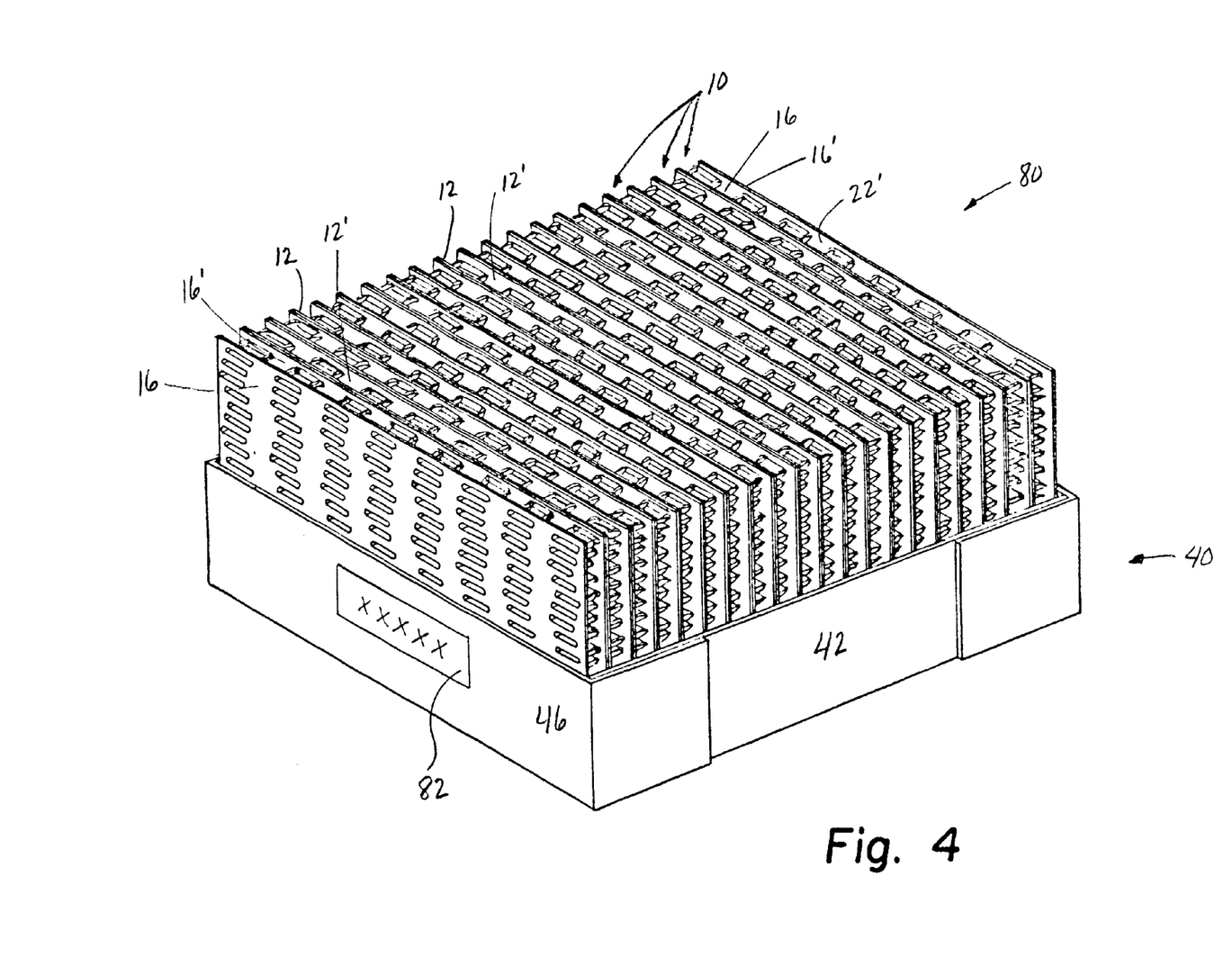
FIG. 4 is a perspective view of a tray with a plurality of connector plate pairs.

FIG. 4 shows a connector plate tray 40 filled with a plurality of adjacent connector plate pairs 10. Adjacent plate pairs 10 are stacked back-to-back in the tray 40. One of the connector plates 12 in one pair is arranged such that the back face 24 (hidden) of the plate base 16 is adjacent to the back face 24' (hidden) of the plate base 16' of one of the connector plates 12' in another pair. The adjacent connector plate pairs are in parallel overlapping relationship. It is desirable for the connector plates to be generally aligned as shown, such that they form a single row 80. Thus, the connector plates 12 and 12' are arranged in pairs 10 with the front faces 22 and 22', or tooth-sides, of the plates facing one another to create a tooth-to-tooth pair 10 as seen in FIG. 2. The connector plate pairs 10 are arranged with the back faces 24 and 24' (hidden) of the plate bases 16 and 16' facing one another in a back-to-back relationship.

In the preferred embodiment, the interior space 70 of the tray 40 is 10 inches (25.4 cm) in width and can hold up to 20 connector plate pairs (40 connector plates), where each connector plate pair is approximately ½ inch (1.3 cm) in combined thickness. The dimensions of the tray 40 can be selected to provide for a loose or snug fit for the connector plates, although a snug fit is preferred. It is understood that the tray 40 may be of any desired width to hold a greater or lesser number of connector plates. It is preferred that the width of the tray be selected to hold an even number of plates where each plate is part of a tooth-to-tooth pair so that the plates on either end of the tray do not have their teeth exposed to a handler. Such an arrangement prevents injuries from contact with the sharp teeth of the connector plates.

Also seen in FIG. 4 is a label 82. The label 82 may be attached or printed directly onto a side, such as side 46 or bottom of the tray. Such a label 82, while optional, allows for the placement of identifying marks, bar codes and the like for inventory and identification purposes. The exact location of the label is not critical.

Figure 5:
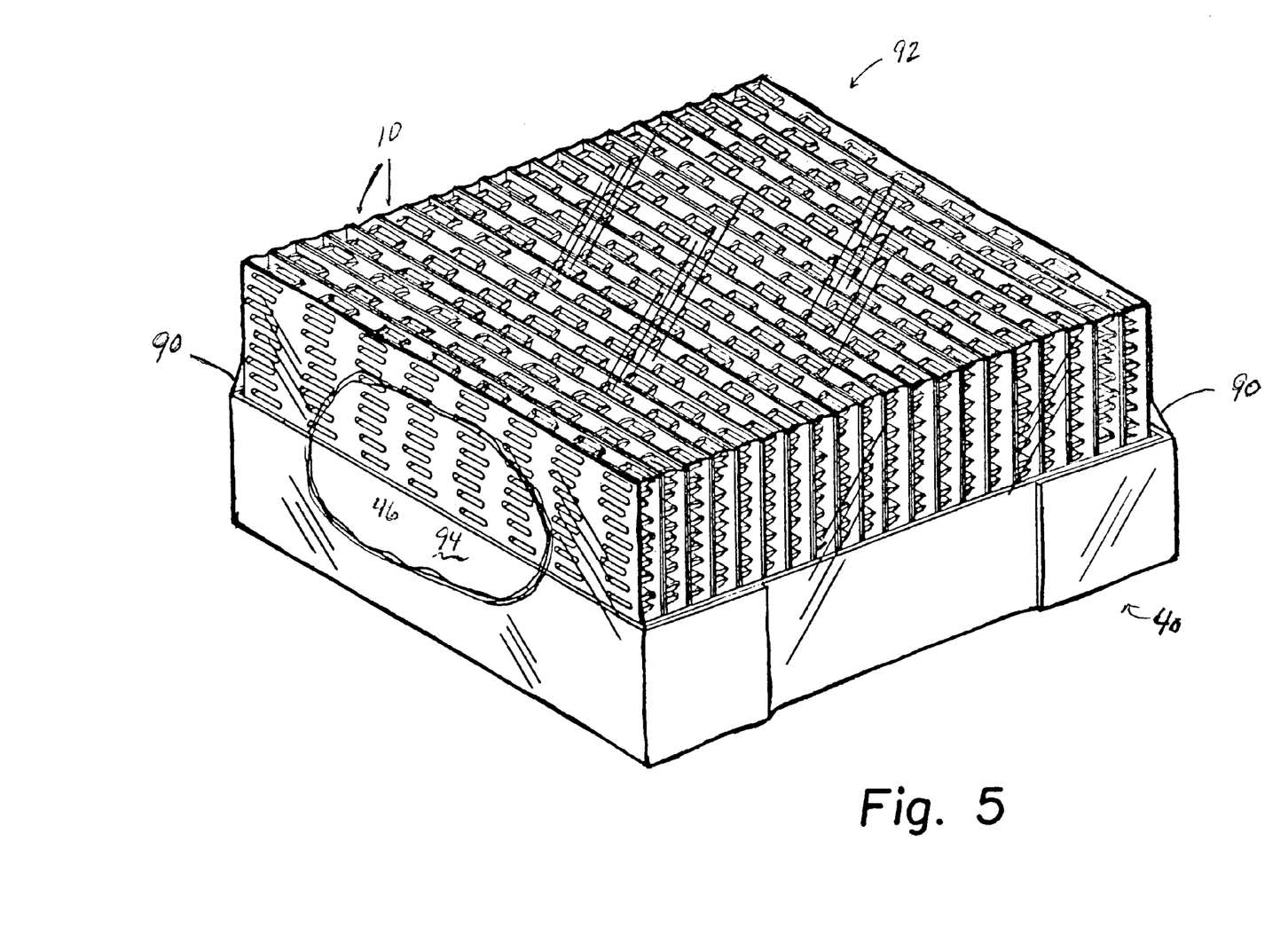
FIG. 5 is a perspective view of a connector plate package having a tray, plate pairs and wrapping material.

Referring to FIG. 5, the tray 40 of connector plates is wrapped or bound in a suitable wrapping material 90 to form a connector plate package referred to generally as 92. Although many materials may be used for wrapping the connector plates and tray, such as plastics, rubbers, burlaps or other fabrics, the preferred wrapping material 90 is a shrink bundling film of plastic. Preferably the wrapping material 90 comprises polypropylene which is malleable when heated to allow wrapping of the tray and plates and shrinks as it cools to form a tightly bound package. Other shrink-wrap materials may be suitable as well, such as polystyrene and polyethylene, but polypropylene is preferred for its durability. Polypropylene and other shrink-wrap bundling materials are commercially available from Delta Plastics of Newark, N.J. The wrapping material 90 is completely wound around the tray 40 and plate pairs 10 to insure a durable wrap. In the preferred embodiment, the wrapping material is designed to leave "bullets," or openings 94 at opposing sides of the tray 40. The bullets 94 allow the connector plate package to "breathe," or ventilate, to prevent problems which can occur in air tight wrappings.

Figure 6:
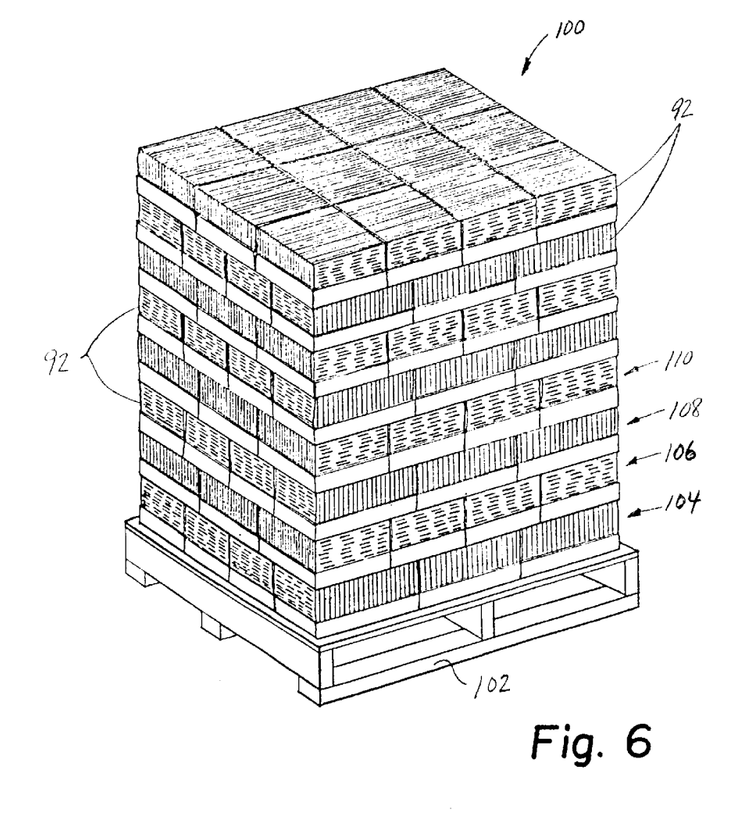
FIG. 6 is a perspective view of a palette with a bundle of connector plate packages.

Individual connector plate packages 92 are suitable for stacking into bundles 100. In FIG. 6 a large number of packages 92 have been stacked into a bundle 100 on a fork-lift palette 102, skid or other support structure. The fork-lift palette 102 allows the packages 92 to be easily loaded with a commercially available fork-lift vehicle. The packages in the preferred embodiment are placed in a bundle 100 which is eight tiers or layers 104 high although the bundle 100 may be lower or higher as desired. Bundles of too great a height can become unstable, so care should be used. Twelve packages 92 are placed in a single layer 104 in a three-by-four formation as seen in FIG. 6. Of course, depending on the size of the packages 92 and palettes 102, greater or fewer packages may be arranged in a layer.

The configuration of the packages may be changed as desired. In one arrangement the first layer 104 of packages are placed in a pattern with the packages in parallel arrangement, side-by-side. The second layer 106 is arranged in a staggered pattern, that is, in an alternating orientation with the packages perpendicular to the packages on the first layer. The third layer 108 is arranged as the first and the fourth layer 110 is arranged as the second. This alternation of orientation continues for each layer on the palette. While this alternating staggered arrangement of layers has been found to provide stability for the stack of packages, other arrangements may be used. For example, the package pattern in one layer may simply be repeated, without any staggering, in each additional layer.

Figure 7:
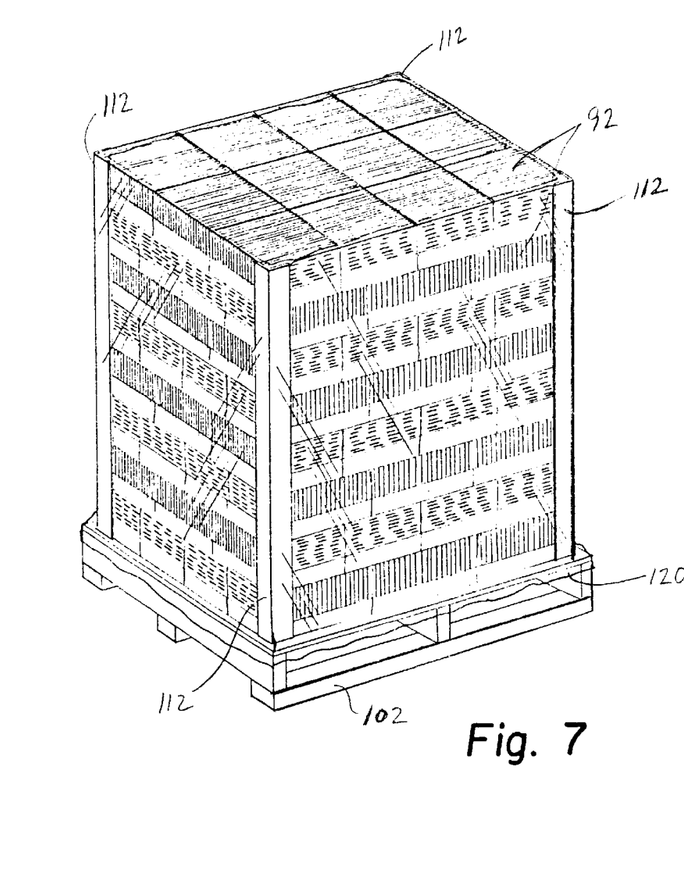
FIG. 7 is a perspective view of a bundle of packages with corner pieces and bundle wrap.

In FIG. 7, cornerboards 112 have been placed on the palette 102 of packages 92. Cornerboards, or V-boards, are not necessary to practice the invention, but are preferred. The cornerboards are made of cardboard, laminated paper, high density plastic or other material and are designed to wrap around the corners of the bundle of packages. The cornerboards provide stability to the bundle of packages on the palette and protect against injury to the packages during handling. In the preferred embodiment, a cornerboard is approximately 40 inches (101.6 cm) tall with an L-shaped cross-section with each leg of the "L" approximately 4 inches (10.2 cm) wide. The cornerboard 112 is placed to abut one corner of the bundle 100 of packages 92 as shown. The cornerboard may vary in height and width and not depart from the spirit of the invention.

Also in FIG. 7 the bundle 100 of packages with cornerboards 112 is wrapped in bundle wrapping material 120. The bundle wrapping material 120, when wound around the entire bundle 100 of packages 92 and cornerboards 112 provides stability to the bundle 100 during transport. The bundle wrapping material 120 may be of many types of material, but plastic stretch wrap is preferred. The bundle wrapping material 120 preferably encloses at least portions of the palette 102, thereby connecting the bundle 100 to the palette 102.

Figure 8:
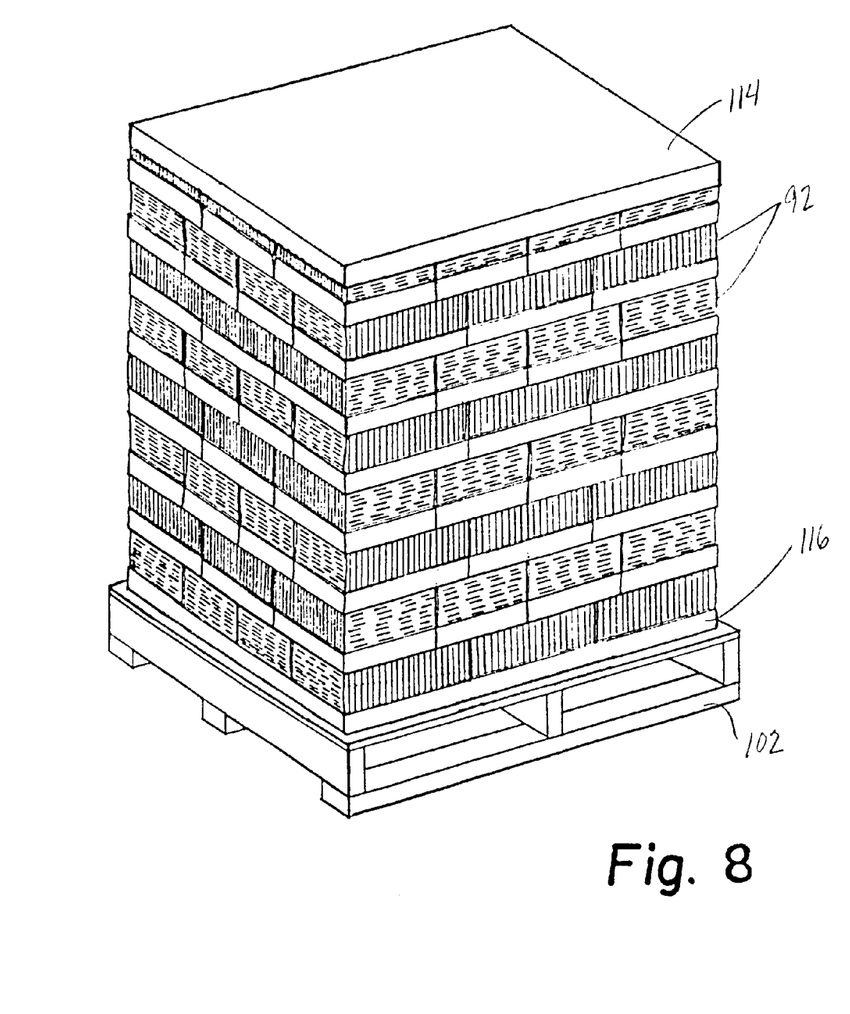
FIG. 8 is a perspective view of a bundle of packages with a top end-cap.

In FIG. 8, a bundle 100 is shown having end-caps rather than corner boards. A top end-cap 114 and, if desired, a bottom end-cap 116, may be used instead of or in conjunction with the cornerboards 112. The end-caps 114 and 116 are placed on the bundle 100 as shown, and add stability to the bundle 100. The end-caps may be wrapped or partially wrapped with bundle wrapping material 120, just as the bundle and cornerboards in FIG. 7.

Figure 9:
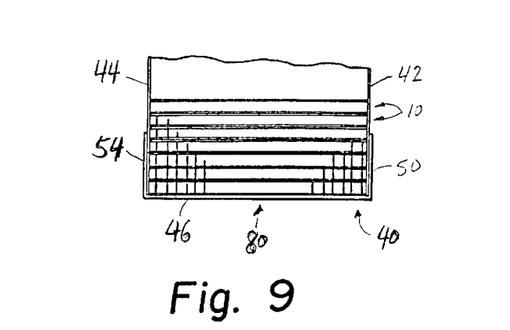
FIG. 9 is a partial top view of an example of a packaging arrangement.
Figure 10:
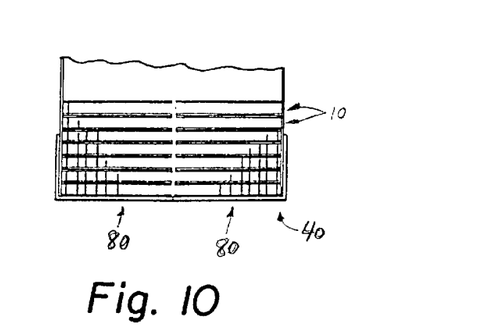
FIG. 10 is a partial top view of an example of a packaging arrangement.
Figure 11:
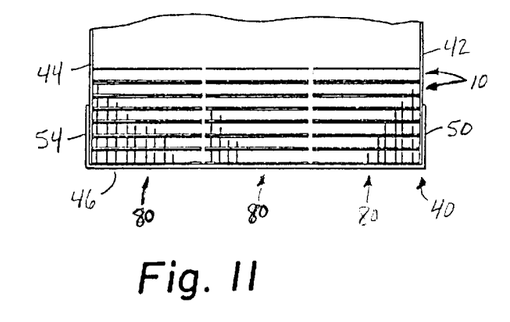
FIG. 11 is a partial top view of an example of a packaging arrangement.
Figure 12:
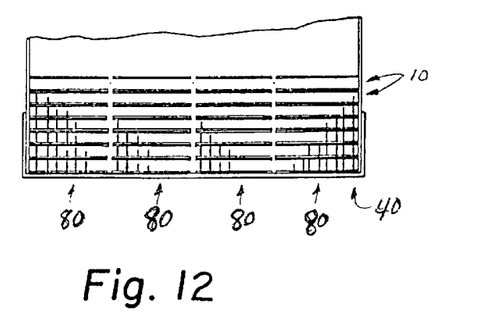
FIG. 12 is a partial top view of an example of a packaging arrangement.

The dimensions and configuration of the connector plates 12 and 12' may vary, as may the dimensions of the tray 40. The configurations shown in FIGS. 9–12 are merely examples based on common connector plate sizes. In FIG. 9, the tray 40 is 8 inches (20.3 cm) long, 10 inches (25.4 cm) wide and holds forty connector plates, or twenty connector plate pairs 10, which are 8 inches (20.3 cm) long. This is the simplest packaging configuration consisting of a single row 80 of 8 inch (20.3 cm) long connector plate pairs 10. In FIG. 9, the same sized tray 40 holds 4 inch (10.2 cm) long connector plates. The connector plate pairs are arranged side-by-side as well as back-to-back in the tray. In this way two rows 80 of plate pairs 10 are placed in the tray 40. If the tray is 10 inches (25.4 cm) wide, it will hold eighty 4 inch (10.2 cm) long plates. In FIG. 11 the plate pairs 10 are arranged side-by-side with three rows 80 of pairs across the width of the tray 40 as shown. And in FIG. 12 four rows 80 of plate pairs 10 are arranged across the width of the tray 40.

The presently most preferred arrangements call for all tray sizes to be 10 inches (25.4 cm) wide with varying lengths of 7, 8, 10 and 12 inches (17.8, 20.3, 25.4 and 30.5 cm).

The presently most preferred plate lengths are 2, 3, 4, 5, 6, 7, 8, 10 and 12 inches (5.1, 7.6, 10.2, 12.7, 15.2, 17.8, 20.3, 25.4 and 30.5 cm). The 7 inch (17.8 cm) long trays will accommodate 7 inch (17.8 cm) long plates in a single row, similar to the configuration of FIG. 10. The 8 inch (20.3 cm) long tray will accommodate a single row of 8 inch (20.3 cm) long plates, two rows of 4 inch (10.2 cm) long plates, or four rows of 2 inch (5.1 cm) long plates. Similarly, the 10 inch (25.4 cm) long tray will accommodate a single row of 10 inch (25.4 cm) long plates, two rows of 5 inch (12.7 cm) long plates, or five rows of 2 inch (5.1 cm) long plates. Lastly, the 12 inch (30.5 cm) long tray will accommodate 12, 6, 4, 3 and 2 inch (30.5, 15.2, 10.2, 7.6 and 5.1 cm) long plates in 1, 2, 3, 4 and 6 rows respectively. Of course other combinations may be desired depending on the needs of the packager or end-user.

The height of the connector plates can also vary substantially. The tray 40 as seen in FIGS. 3 and 4 is 2 inches (5.1 cm) in height, while the plates housed therein are 5 inches (12.7 cm) in height PH. Thus the connector plates 12 extend past the top of the tray as shown. The connector plates shown are only one example and the height of the plates may vary with design needs. The presently most desired connector plate heights are 2½, 3, 3½, 4, 5, 6, 7, 8, 10 and 12 inches (6.4, 7.6, 8.9, 10.2, 12.7, 15.2, 17.8, 20.3, 25.4 and 30.5 cm).

The method of packaging the connector plates is apparent from the arrangement of the constituent parts. Connector plates are arranged in tooth-to-tooth pairs. The connector plate pairs are arranged back-to-back in the tray as seen in FIG. 4. If desired, a label is affixed to the tray. The tray, with the plates disposed therein, is bound in wrapping material to create a connector plate package. The packages can be stacked into bundles on a palette as desired. If desired, cornerboards are placed on the bundles as seen in FIG. 7. The bundle is bound or would up with bundle wrapping material. The wrapped bundle is ready for transport or storage.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

Having described the invention, we claim:

1. A connector plate package comprising:
   a tray having a tray height, and
   a plurality of connector plate pairs, each connector plate having a plate height, each connector plate pair having two connector plates in tooth-to-tooth arrangement, each connector plate pair being in back-to-back arrangement with at least one other connector plate pair, said plurality of connector plate pairs disposed in a generally upright orientation in said tray, the tray height of less than the plate height.

2. The connector plate package of claim 1, said tray having four sides and a bottom defining an interior space, said plurality of connector plate pairs disposed in said interior space.

3. The connector plate package of claim 1, said connector plates arranged to be generally in alignment to form a single row of plates.

4. The connector plate package of claim 1, said plurality of said connector plates disposed in said tray in multiple rows.

5. The connector plate package of claim 1, said plurality of said connector plate pairs consisting of connector plates of various size.

6. The connector plate package of claim 1, further comprising wrapping material enclosing said tray and said connector plates.

7. The connector plate package of claim 6, said wrapping material completely enclosing said tray and said connector plates.

8. The connector plate package of claim 6, wherein said wrapping material is shrink-wrap plastic film.

9. The connector plate package of claim 8, wherein said shrink-wrap plastic film is a polypropylene blend.

10. The connector plate package of claim 1, further comprising a label attached to said tray.

11. A connector plate package comprising:
    a tray having a tray height and having four sides and a bottom defining an interior space, no portion of the tray extending over the interior space; and
    a plurality of connector plate pairs, each connector plate of each pair having a plate height and having a generally planar base with a front face, back face, and a plurality of teeth extending from the front face thereof, each said connector plate of each connector plate pair arranged such that the teeth thereof extend toward the other connector plate of said pair, said connector plate pairs arranged such that said back face of said planar base of one of said connector plates of one of said pairs is in generally parallel abutment with said back face of said planar base of one of said connector plates of another said pair, said plurality of connector plate pairs disposed in a generally upright orientation in the interior space of said tray, the tray height less than the plate height.

12. The connector plate package of claim 11, said connector plates arranged to be generally in alignment to form a single row of plates.

13. The connector plate package of claim 11, said plurality of said connector plates disposed in said tray in multiple rows.

14. The connector plate package of claim 11, said plurality of said connector plate pairs consisting of connector plates of various size.

15. The connector plate package of claim 11, further comprising wrapping material enclosing said tray and said connector plates.

16. The connector plate package of claim 15, said wrapping material completely enclosing said tray and said connector plates.

17. The connector plate package of claim 15, wherein said wrapping material is shrink-wrap plastic film.

18. The connector plate package of claim 17, wherein said shrink-wrap plastic film is a polypropylene blend.

19. The connector plate package of claim 11, further comprising a label attached to said tray.

20. A bundle of connector plate packages comprising:
    a plurality of connector plate packages, each said package having a tray with a tray height and a plurality of connector plate pairs, each connector plate of each pair having a plate height of greater than the tray height, a generally planar base with a front face, back face, and a plurality of teeth extending from the front face thereof, each said connector plate of each connector plate pair arranged such that the teeth thereof extend toward the other connector plate of said pair, said connector plate pairs arranged such that said back face of said planar base of one said connector plates of one of said pairs is in generally parallel abutment with said back face of said planar base of one of said connector plates of another said pair, said plurality of connector plate pairs disposed in said tray, in a generally upright orientation,
    said plurality of connector plate packages arranged in a stack, said stack having multiple adjacent layers, each said layer having a group of packages arranged in abutting relationship.

21. The bundle of claim 20, wherein each of said packages of said plurality of packages are arranged in said stack in a generally upright orientation.

22. The bundle of claim 20, said packages in one layer in staggered relationship with packages in an adjacent layer.

23. The bundle of claim 22, wherein said packages in one layer are arranged in a pattern, said pattern having a first orientation, said packages in an adjacent layer are arranged in said pattern having a second orientation such that said packages in one layer are in staggered relationship with packages in an adjacent layer.

24. The bundle of claim 20, wherein said connector plate packages are stacked on a support structure.

25. The bundle of claim 24, wherein said support structure is a fork-lift palette.

26. The bundle of claim 24, further comprising cornerboards.

27. The bundle of claim 26, wherein each of said cornerboards is in abutting relationship with at least one of said connector plate packages in each said layer.

28. The bundle of claim 24, further comprising a top end-cap.

29. The bundle of claim 28, further comprising a bottom end-cap.

30. The bundle of claim 28, wherein said top end-cap is in abutting relationship with each said package in a top layer.

31. The bundle of claim 20, further comprising bundling material enclosing said plurality of connector plate packages.

32. The bundle of claim 20, wherein said bundling material completely encloses said stack of packages.

33. The bundle of claim 24, further comprising bundling material wherein said bundling material at least partially encloses said stack and said support structure thereby connecting said stack to said support structure.

34. The bundle of claim 26, further comprising bundling material wherein said bundling material at least partially encloses said stack, said cornerboards and said support structure thereby connecting said stack, said cornerboards and said support structure.

35. The bundle of claim 34, wherein said bundling material is polyethylene stretch wrap plastic.

36. The bundle of claim 28, further comprising bundling material wherein said bundling material at least partially encloses said stack, said top end-cap and said support structure thereby connecting said stack, said top end-cap and said support structure.

37. A method of packaging connector plates comprising the steps of:

arranging connector plates in a plurality of connector plate pairs, each connector plate of each said pair having a plate height and a generally planar base with a front face, a back face, and a plurality of teeth extending from the front face thereof, such that the teeth of each said connector plate of each said pair extend toward the other connector plate of said pair;

arranging said connector plate pairs such that said back face of said planar base of one of said connector plates of one of said pairs is in generally parallel abutment with said back face of said planar base of one of said connector plates of another said pair, and disposing said plurality of connector plate pairs in a generally upright orientation in a tray having a tray height of less than the plate height.

38. The method of claim 37 wherein the step of disposing said plurality of connector plate pairs in a tray further comprises the step of arranging said connector plate pairs in said tray in a single row.

39. The method of claim 37 further comprising the step of enclosing said tray and said connector plate pairs in wrapping material to form a connector plate package.

40. The method of claim 39 wherein said wrapping material completely encloses said tray and said connector plate pairs.

41. The method of claim 39 wherein said wrapping material is polypropylene shrink wrap plastic film.

42. The method of claim 37 further comprising the step of bundling a plurality of said connector plate packages.

43. The method of claim 42, the step of bundling a plurality of said connector plate packages further comprising the step of arranging said plurality of said connector plate packages in a stack, said stack having multiple adjacent layers, each said layer having a group of packages arranged in abutting relationship.

44. The method of claim 43 wherein said stack is placed on a support structure.

45. The method of claim 43 further comprising the step of placing cornerboards adjacent to said stack.

46. The method of claim 45 wherein each of said cornerboards is placed in abutting relationship with at least one of said connector plate packages in each said layer.

47. The method of claim 43, further comprising the step of placing a top end-cap adjacent the top layer of said stack.

48. The method of claim 43 further comprising the step of enclosing said plurality of packages in bundling material.

49. The method of claim 48, wherein said bundling material completely encloses said stack.

50. The method of claim 44, further comprising the step of enclosing said plurality of packages in bundling material wherein said bundling material at least partially encloses said stack and said support structure thereby connecting said stack to said support structure.

51. The method of claim 45, further comprising the step of enclosing said plurality of packages in bundling material wherein said bundling material at least partially encloses said stack, said cornerboards and said support structure thereby connecting said stack, said cornerboards and said support structure.

52. The method of claim 48 wherein said bundling material is polyethylene stretch wrap plastic.

* * * * *

UNITED STATES PATENT AND TRADEMARK OFFICE
CERTIFICATE OF CORRECTION

PATENT NO. : 6,527,114 B2 Page 1 of 1
DATED : March 4, 2003
INVENTOR(S) : Charles W. Bishop and Carl E. Virta It is certified that error appears in the above-identified patent and that said Letters Patent is hereby corrected as shown below:

Column 1,
Line 13, change "teed" to -- teeth --;

Column 2,
Line 12, after "thereof" insert a -- . --;
Line 21, "in" second occurrence should be -- In --.

Signed and Sealed this

Eleventh Day of November, 2003

JAMES E. ROGAN
*Director of the United States Patent and Trademark Office*